US008567194B2

(12) United States Patent
Bailey et al.

(10) Patent No.: US 8,567,194 B2
(45) Date of Patent: Oct. 29, 2013

(54) FLOATING PLATFORM WITH DETACHABLE SUPPORT MODULES

(75) Inventors: Stephen L. Bailey, Los Gatos, CA (US);
Joseph Van Ryzin, Kailua, HI (US);
Patrick D. Grandelli, Kailua, HI (US);
Natalie Levings, Palm Beach Gardens, FL (US); John E. Halkyard, Houston, TX (US)

(73) Assignees: Lockheed Martin Corporation, Bethseda, MD (US); Makai Ocean Engineering, Waimanalo, HI (US)

( * ) Notice: Subject to any disclaimer, the term of this patent is extended or adjusted under 35 U.S.C. 154(b) by 959 days.

(21) Appl. No.: 12/688,468

(22) Filed: Jan. 15, 2010

(65) Prior Publication Data

US 2010/0180924 A1 Jul. 22, 2010

Related U.S. Application Data

(60) Provisional application No. 61/145,467, filed on Jan. 16, 2009.

(51) Int. Cl.
*F03G 7/05* (2006.01)
*B63B 35/44* (2006.01)

(52) U.S. Cl.
USPC .................. 60/641.7; 114/264; 405/224

(58) Field of Classification Search
USPC .............. 60/641.6–641.7; 405/203, 204, 209, 405/224; 114/264–266
See application file for complete search history.

(56) References Cited

U.S. PATENT DOCUMENTS

| 3,011,467 | A | * | 12/1961 | Letourneau | 114/265 |
| 3,163,147 | A | * | 12/1964 | Collipp | 114/265 |
| 4,498,412 | A | * | 2/1985 | Liden | 114/264 |
| 5,653,188 | A | | 8/1997 | Molin | |
| 6,503,023 | B2 | | 1/2003 | Huang et al. | |
| 6,701,861 | B2 | * | 3/2004 | Key et al. | 114/265 |
| 7,140,317 | B2 | * | 11/2006 | Wybro et al. | 114/264 |
| 2009/0205554 | A1 | * | 8/2009 | Srinivasan | 114/264 |
| 2009/0260358 | A1 | * | 10/2009 | Rapp et al. | 60/641.7 |

OTHER PUBLICATIONS

Haslum et al., "The Kikeh Spar and Tender Assist Drilling".

* cited by examiner

*Primary Examiner* — Hoang Nguyen
(74) *Attorney, Agent, or Firm* — Kaplan Breyer Schwarz & Ottesen

(57) ABSTRACT

A floating support that can be joined with a floating platform while the floating platform is at a deployment location is disclosed. The support provides functionality to the floating platform in order to change, augment, upgrade, or diversify the platform's overall capability. In some embodiments, the present invention eases the serviceability of the platform by enabling a first support that has diminished capability to be readily replaced by a second support having superior capability—without removing the floating platform from its deployment location. In some embodiments, the present invention enables platform operation that is analogous to "plug and play" electronics systems. Further, in some embodiments, hydrodynamic performance of the floating platform can be changed with the addition or removal of one or more floating supports.

20 Claims, 7 Drawing Sheets

FLOATING PLATFORM WITH DETACHABLE SUPPORT MODULES

CROSS REFERENCE TO RELATED APPLICATIONS

This case claims priority of U.S. Provisional Patent Application 61/145,467, which was filed on Jan. 16, 2009, and which is incorporated herein by reference.

In addition, the underlying concepts, but not necessarily the language, of the following cases are incorporated by reference:

(1) U.S. patent application Ser. No. 61/225,991, filed Jul. 16, 2009;
(2) U.S. patent application Ser. No. 61/628,594, filed Dec. 1, 2009;
(3) U.S. patent application Ser. No. 61/573,982, filed Oct. 6, 2009; and
(4) U.S. Pat. No. 6,503,023, which issued Jan. 7, 2003.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to off-shore installations in general, and, more particularly, to floating platforms.

BACKGROUND OF THE INVENTION

Offshore platforms are used to house workers and support production equipment at sites located in a large body of water. They are used in such applications as petroleum drilling and production, Ocean Thermal Energy Conversion (OTEC), and remote radar installations. Depending on the circumstances, an offshore platform might be fixed to the ocean floor, built on an artificial island, or floating at the surface of the body of water.

For deep-water applications, floating platforms, such as spars and semi-submersible platforms are typically used. Such floating platforms are subject to motion due to dynamic wave and wind forces. Platform motion can cause unacceptable stresses in riser and mooring lines and, in some cases, can curtail deck operations for extended periods of time.

Platform motion is particularly problematic for petroleum drilling and OTEC applications. In petroleum drilling applications, for example, platform motions must be kept small because many of these platforms comprise riser pipes that are rigidly fixed to the sea bed and attached to the platform. Typical OTEC systems normally include large diameter cold water pipes, which are suspended from their platforms and hang down to cold deep water regions. These cold water pipes can have lengths of 1000 meters or more. Excessive platform motion induces severe strains in these cold water pipes, which can lead to system failure.

In order to increase the reliability and lifetime of floating platform installations, a number of methods for reducing motion of a floating offshore platform have been developed in the prior art. These include:

i. Providing a small waterplane area to reduce the wave loadings at the free surface;
ii. providing a deep draft to establish the keel of the body to be below the area of the highest wave energy, and to achieve a low center of gravity;
iii. using vertically rigid moorings; and
iv. providing hydrodynamic optimization, such as using wave force cancellation between the columns and pontoons of a semi-submersible platform.

These methods, however, increase the cost and complexity of the floating platforms.

A Spar platform is based upon a large-diameter, single or multiple vertical cylinder(s) that supports a deck above the surface of the water. About 90% of a typical spar structure is underwater. The cylinder is analogous to a deep-draft floating caisson, which is a hollow cylindrical structure similar to a very large buoy. A distinguishing feature of a spar is its deep-draft hull, which produces very favorable motion characteristics compared to many other floating concepts.

Due to its deep draft, a typical spar is deployed by floating it horizontally in a harbor or quay, towing it to a deployment site, and then upending it into a vertical orientation. Once oriented vertically, a derrick barge is used to lift a deck structure into place. This process is extremely expensive and time consuming.

Semi-submersible platforms are platforms configured with large buoyant pontoon structures that float below the water surface. Structural columns, attached to the pontoons pass through the water surface to support a platform deck at a significant height above the sea surface. Semi-submersible platforms can be anchored to the ocean floor or kept in position by attached thrusters.

The draft of some semi-submersible platforms can be transformed from a deep-draft to a shallow-draft by removing ballast water from its hull. A shallow-draft platform is analogous to a surface vessel and can be towed from a harbor or quay to its deployment location by a tugboat. Once at its intended location, ballast water is added to back into the hull to return the platform to a deep-draft configuration.

With its hull structure submerged at a deep draft, the semi-submersible platform is analogous to a spar and is less affected by wave loadings than a normal ship. Since a typical semi-submersible platform has a small water-plane area, however, it is sensitive to load changes on its deck. As a result, careful trimming is necessary to maintain platform stability.

In addition, a conventional spar or semi-submersible is designed to satisfy a single, rigid set of operational requirements expected throughout its operational lifetime. As a result, the amount of buoyancy and deck space made available for equipment and personnel are pre-determined based upon several factors: the environmental characteristics of its intended deployment location; the intended application of the platform; and its desired production capacity.

Once a conventional floating platform has been deployed at its deployment location, the flexibility of a floating platform is limited by the pre-determined design. In order to increase production capacity (e.g., increase drilling depth, modify the deck for additional equipment, add additional energy conversion equipment, change the configuration of equipment, etc.), the platform must be transported to a drydock, where the additional equipment and additional buoyancy (if necessary) can be conveniently added. In addition to the large expense such an operation incurs, the platform is also removed from service during the period of transportation and refit.

SUMMARY OF THE INVENTION

The present invention enables one or more characteristics of a floating platform to be changed while the platform remains at its deployment location. The present invention is suitable for use with any suitable floating platform, such as semi-submersible platforms or spars. The present invention is particularly well-suited to off-shore petroleum drilling platforms, OTEC platforms, off-shore windmill farms, and ocean-based radar installations. In some embodiments, the present invention enables alteration and/or repair of on-board systems of a floating platform.

In some embodiments, the present invention comprises a detachable floating column (i.e., support) that can be transported to a previously deployed off-shore platform. Once at the deployment location of the platform, the support is properly oriented and physically joined with the platform. In some embodiments, the addition of one or more supports to a platform enables:

i. an increase in the payload capability of the platform; or
ii. increased stability of the platform; or
iii. increased deck area; or
iv. shallower draft of the platform; or
v. improved dynamic characteristics of the platform; or
vi. improved ability to survive a localized environment; or
vii. augmented, changed, or expanded functionality of the platform; or
viii. refurbishment and/or refitting of production equipment at the deployment location; or
ix. any combination of i, ii, iii, iv, v, vi, vii, and viii.

In some embodiments, a support comprises significant deck space to enable an increase in the available working area of a platform after the support has been mounted to it. In some embodiments, the support supports the addition of an additional deck module to increase the available working area of the platform.

In some embodiments, a support comprises one or more storage areas that enable the support to contain equipment such as production systems or sub-systems (e.g., heat exchangers, pump systems, etc.) that augment, redefine, or expand the production capability of the platform.

In some embodiments, a support comprises one or more integrated heat exchangers. As a result, heat exchanger capacity and/or electrical generation capability of a deployed platform can be augmented by the addition of one or more of such supports. Further, the use of such supports facilitates maintenance of heat exchangers located at the platform by enabling a problematic heat exchanger to be replaced by a new or refurbished heat exchanger without removing the platform from service. This reduces the amount of operational capability lost due to preventive maintenance, disaster recovery, and/or failure recovery.

In some embodiments, a support enables improved stability of a platform so that the platform is less susceptible to local wind, wave, and storm conditions. As a result, OTEC platforms that comprise a long, suspended cold-water pipe can have improved reliability.

An embodiment of the present invention comprises: a method comprising (1) providing a platform module at a deployment location in a body of water, wherein the platform module is characterized by a first hydrodynamic performance, and wherein the platform module is hydrodynamically stable at the deployment location; (2) conveying a first support from a first location to the deployment location, wherein the first support is characterized by a second hydrodynamic performance, and wherein the first support comprises a first system having a first functionality; and (3) physically joining the first support and the platform module while the first support and the platform module are at the deployment location, wherein the first support and the platform module are physically joined at a first mounting position on the platform module; wherein the physically joined first support and platform module are collectively characterized by a third hydrodynamic performance.

DETAILED DESCRIPTION

The following terms are defined for use in this Specification, including the appended claims:

Physically joined is defined as meaning substantially rigidly connected. Two objects might be physically joined in direct contact with one another, or through an intermediary element, such as a mounting system.

Deployment location is defined as the deep-water position in a body of water at which a semi-submersible platform is stationed for operation. Deployment location does not include quayside locations or harbors, such as those normally used for the construction of a semi-submersible platform. For example, a conventional semi-submersible platform is typically assembled in a harbor or at quayside and then towed to its deployment location where it is put into operation.

Figure 1:
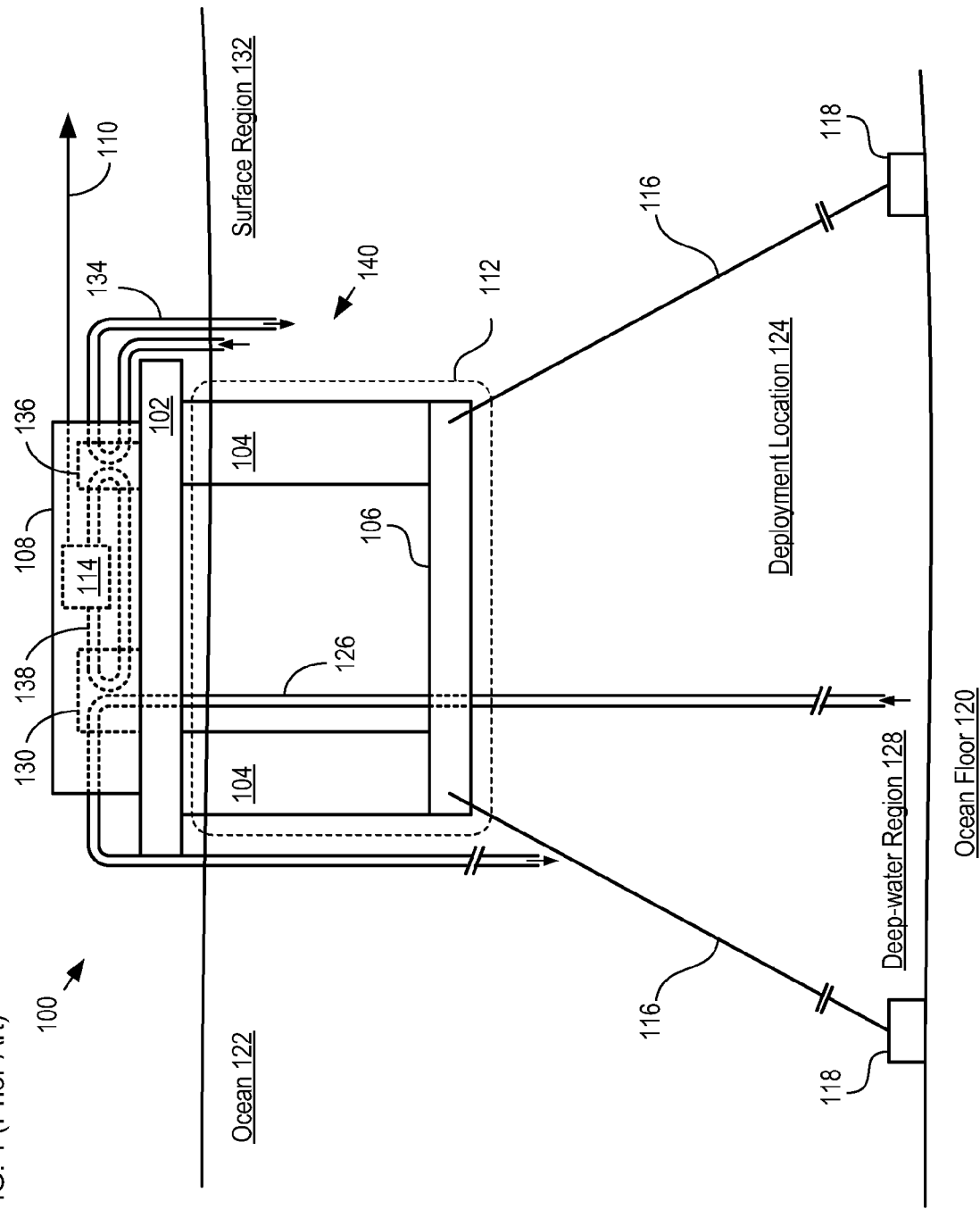
FIG. 1 depicts a schematic drawing of a semi-submersible platform in accordance with the prior art.

FIG. 1 depicts a schematic drawing of a semi-submersible platform in accordance with the prior art. Platform 100 comprises deck 102, submerged structure 112, OTEC system 108, cold-water conduit 126, mooring lines 116, and anchors 118. Platform 100 is configured for use in an OTEC application.

Deck 102 is a platform for supporting OTEC system 108 and heat exchangers 130 and 136, as well as operational personnel and their quarters. Deck 102 is supported above the surface of the water by submerged structure 112. Deck 102 has a fixed work area since the size of deck 102 is determined at platform design.

Submerged structure 112 comprises columns 104 and frames 106. Submerged structure 112 and deck 102 collectively define platform module 140.

Each of columns 104 is a vertical column that has a buoyancy and water plane area suitable for supporting deck 102 above the surface of the water. Columns 104 are held in place by frame 106. In some cases, frame 106 comprises pontoons that augment the buoyancy of columns 104.

OTEC system 108 comprises heat exchangers 130 and 136, closed-loop conduit 138, and turbogenerator 140. OTEC system 108 is a Rankine engine that generates electrical energy based on the temperature differential between water from surface region 132 and water from deep-water region 128. The generated electrical energy is provided on output cable 110. Turbogenerator 140 is driven by a working fluid (e.g., ammonia, etc.) in close-loop conduit 138, which is vaporized at heat exchanger 136. The working fluid is vaporized by its thermal coupling with warm water from surface region 132 that is pumped through heat exchanger 136 via conduit 134. After passing through turbogenerator 140, the working fluid is condensed back into liquid form at heat exchanger 130, where it is thermally coupled with cold water conveyed from deep-water region 128 by conduit 126. After passing through heat exchanger 130, the cold water is typically ejected by conduit 126 into a mid-level region of ocean 122 to avoid significantly cooling the water in surface region 132.

Cold-water conduit 126 is a long conduit suitable for conveying cold water up to deck 102 from deep-water region 128. Typically, cold-water conduit 126 has a length of 1000-2000 meters. As a result, conduit 126 is susceptible to damage caused by lateral motion of platform 100.

To avoid significant motion of platform 100, it is held in position, laterally and vertically, at deployment location 124 by a mooring system that comprises mooring lines 116 that are attached to anchors 118, which are anchored to ocean floor 120 of ocean 122. Anchors 118 are located outside the perimeter of deck 102 so that they provide horizontal stabilization.

The characteristics of deck 102, submerged structure 112, and the mooring system, such as draft, payload, deck area, water plane area, mooring line tension, and the like, collectively determine the hydrodynamic behavior of platform 100. These factors are determined at platform design and are based upon environmental conditions at deployment location 124 and the intended application of platform 100. These environmental conditions are geographically based as well as water-depth based and include, for example, storm history, underwater currents, wind conditions, wave height, wavelengths, water temperature, and the like.

Figure 2:
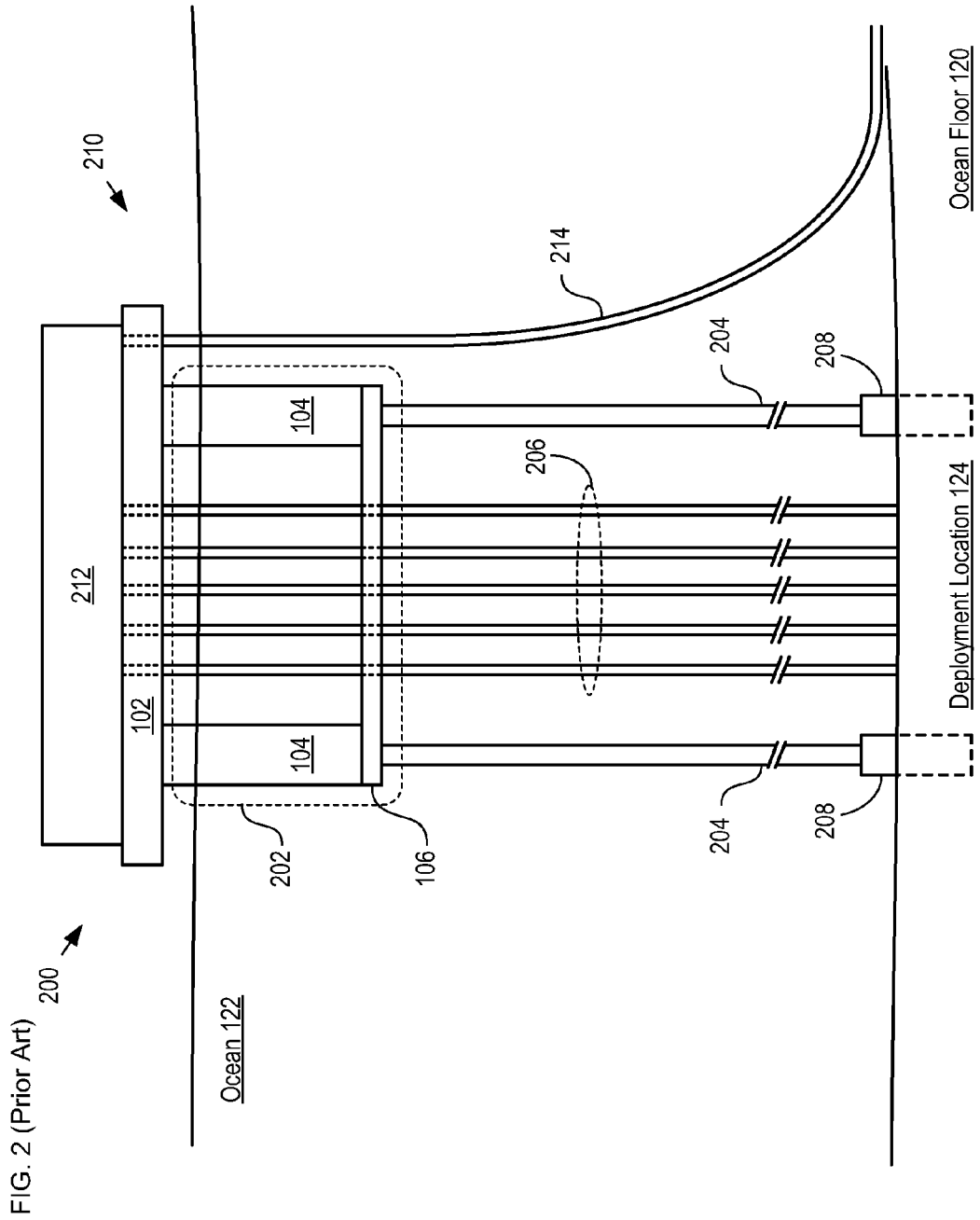
FIG. 2 depicts a schematic diagram of a Tension Leg Platform (TLP) oil production platform in accordance with the prior art.

FIG. 2 depicts a schematic diagram of a Tension Leg Platform (TLP) oil production platform in accordance with the prior art. Platform 200 comprises deck 102, hull 202, tension legs 204, production risers 206, piles 208, production system 212, and export pipeline 214.

Hull 202 is a partially buoyant structure that supports deck 102. In similar fashion to platform 100, hull 202 comprises buoyant columns 104, which are held in place by frame 106. In some cases, frame 106 comprises pontoons that augment the buoyancy of columns 104.

Deck 102 and hull 202 collectively define platform module 210.

Tension legs 204 are stiff structural members that secure deck 102 and hull 202 to ocean floor 120. Tension legs 204 are commonly steel pipes of sufficient size and strength to withstand strains due to wave action and the like. Tension legs 204 are attached between hull 202 and piles 208. In some cases, tension legs 204 are vertically oriented mooring lines that are connected to anchors located at ocean floor 120.

Piles 208 are typically concrete or steel piles driven into ocean floor 120 by means of a hydraulic hammer.

Production risers 206 are conduits for conveying petroleum products from reservoirs (not shown) under the seabed to deck 102.

Tension legs 204 and piles 208 collectively define a mooring system that maintains platform 200 at deployment location 124. Tension legs 204 are held in tension by the buoyancy of hull 202. This dampens vertical motions of platform 200, but allows horizontal movement due to wind, waves and current. In order to limit horizontal movement, tension legs 204 are typically pre-tensioned to a high value. This increases the amount of buoyancy required for a TLP compared to a comparable semi-submersible platform, such as platform 100.

Production system 212 typically includes oil drilling rigs, pumps, etc. that are necessary to extract petroleum products from production risers 206 and deliver them to a storage facility via export pipeline 214.

Figure 3:
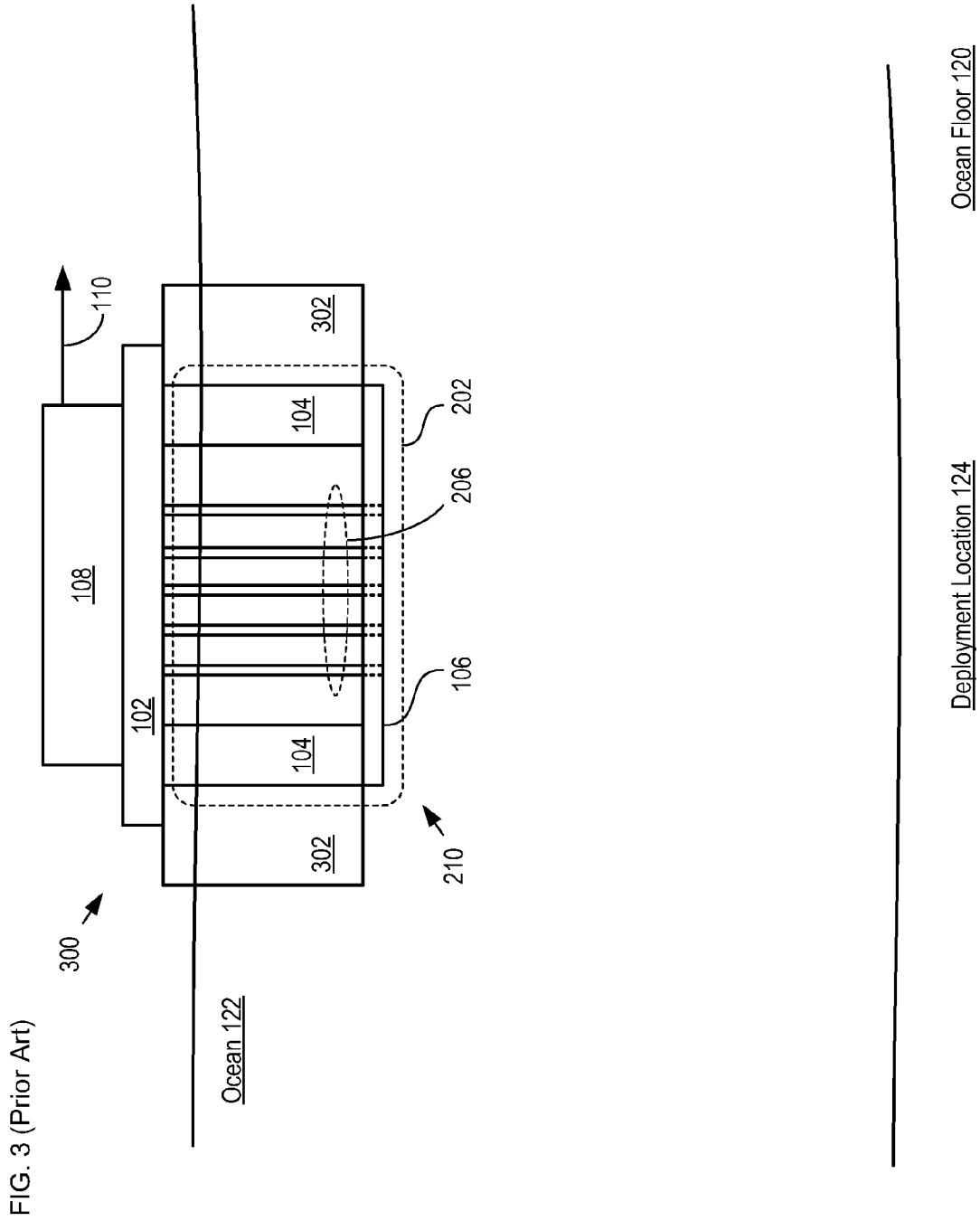
FIG. 3 depicts a TLP platform during installation in accordance with the prior art.

FIG. 3 depicts a TLP platform during installation in accordance with the prior art. Once platform 300 is fully assembled, it is analogous to platform 200 and comprises floating structure 210 and tension legs 204. In FIG. 3, however, platform 300 is depicted prior to installation of tension legs 204 at deployment location 124 and, therefore, comprises only floating structure 210.

Some TLP platforms are unstable prior to the attachment of its tension legs. As a result, a TLP platform in this condition is likely to capsize and assume an upside down orientation. Once the TLP platform is moored by tendons or tension legs, however, the structure becomes stable.

As a result, temporary stability modules (TSMs) 302 have been utilized in the prior art to temporarily stabilize floating structure 210. TSMs are disclosed, for example, by E. Huang, et al., in U.S. Pat. No. 6,503,023, which issued Jan. 7, 2003, which is included by reference herein. Each of TSMs 302 is a substantially hollow rectangle made of a semi-solid material (e.g., foam). In some cases, TSMs 302 comprise inflatable bags commonly used in offshore salvage operations.

By outfitting it with one or more TSMs 302, the stability of floating platform 210 is improved to enable its assembly in a shallow harbor or quayside and subsequent towing to deployment location 124. Once tension legs are attached at the deployment location, TSMs 302 are removed from platform 300.

It should be noted that, since the TSMs 302 are intended only for short-term use at the deployment location, they are constructed of materials that are insufficient for withstanding the environmental conditions at deployment location 124 for long periods of time. For example, Huang discloses that "Because the TSM is a temporary device, which is removed after the platform is installed, less stringent design and material requirements are imposed, which lowers the cost of the device." Huang provides TSMs as substantially hollow watertight containers made of combinations of metals, plastics, and/or composites, inflatable bags, or low-density or semi-solid materials, such as foams. Although this inexpensive construction methodology reduces the cost and complexity of TSMs 302, such construction limits their use to only temporary deployment applications.

Figure 4:
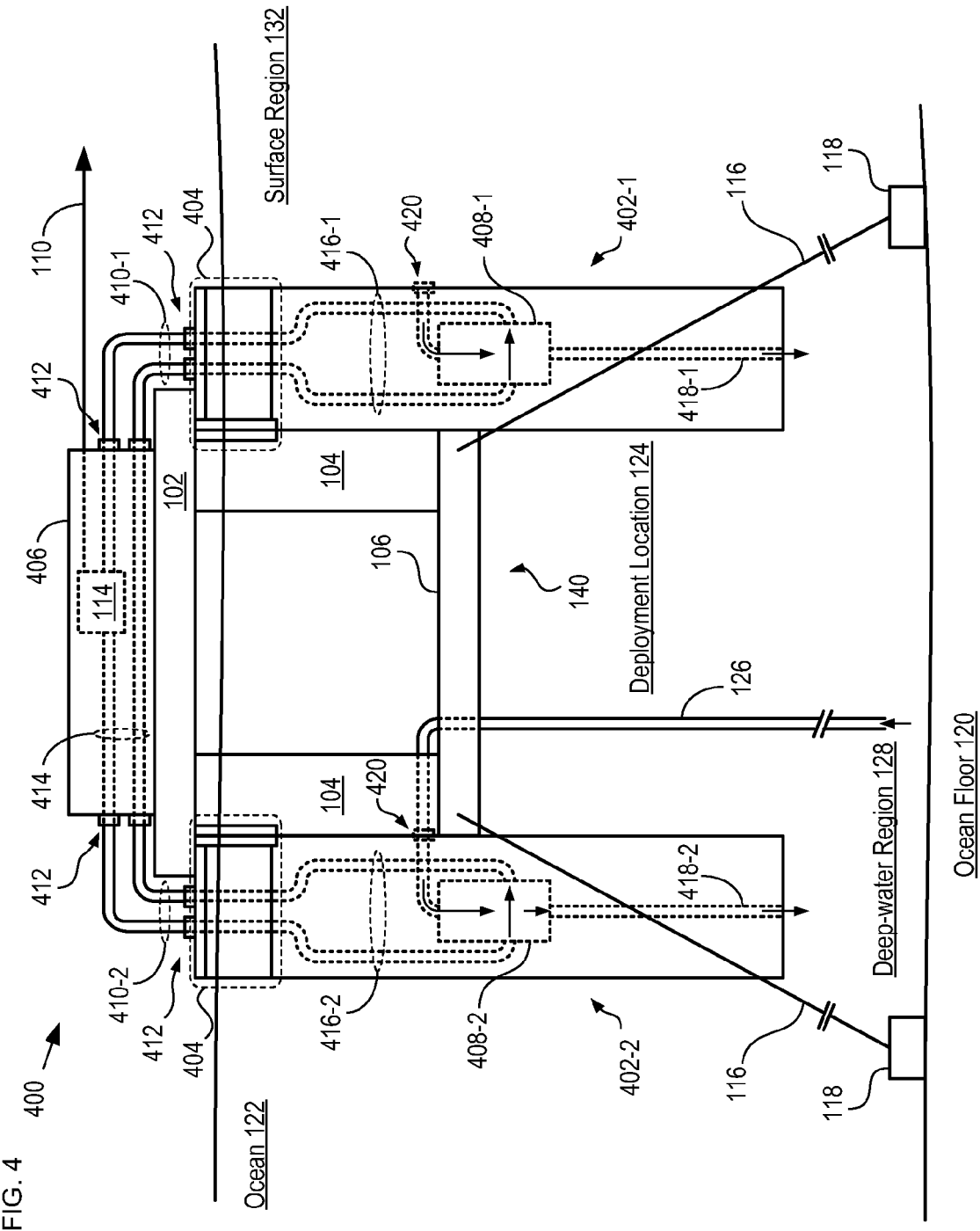
FIG. 4 depicts a schematic diagram of a semi-submersible OTEC platform in accordance with an illustrative embodiment of the present invention.

FIG. 4 depicts a schematic diagram of a semi-submersible OTEC platform in accordance with an illustrative embodiment of the present invention. Platform 400 platform module 140, mooring lines 116, anchors 118, supports 402-1 and 402-2, mounting systems 404, and OTEC system 406.

Figure 5:
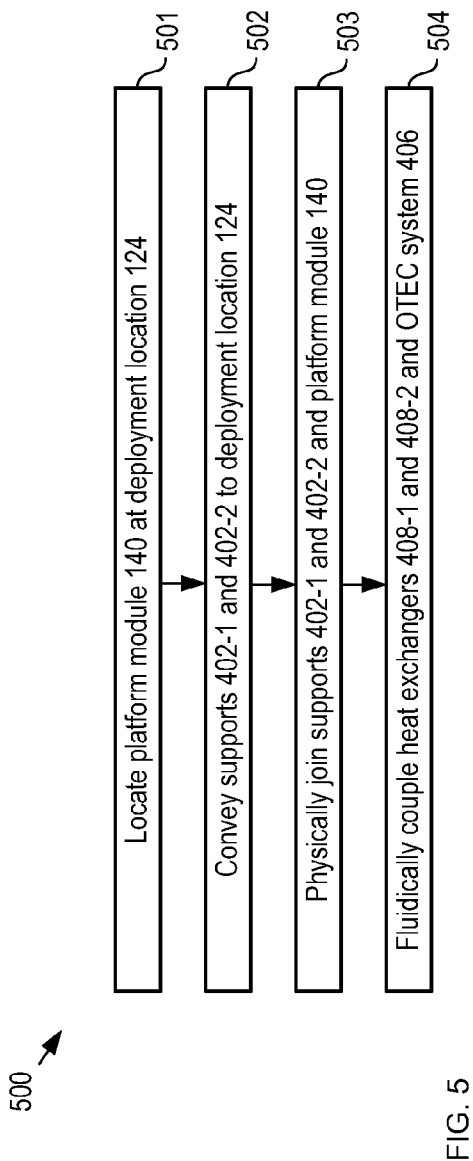
FIG. 5 depicts operations of a method suitable for adding functionality to a floating platform in accordance with the illustrative embodiment of the present invention.

FIG. 5 depicts operations of a method suitable for adding functionality to a floating platform in accordance with the illustrative embodiment of the present invention. Method 500 is described herein with continuing reference to FIG. 4 and additional reference to FIGS. 6 and 7.

Method 500 begins with operation 501, wherein platform module 140 is provided at deployment location 124. Typically platform module 140 is built at a construction site near a shore installation, such as in a shallow-draft harbor or quayside location. Platform module 140 is characterized by a first hydrodynamic performance that facilitates its construction and commissioning in a shallow-water environment. For example its hydrodynamic performance is typically suitable for quayside installation and commissioning of topside deck equipment, as well as facilitating the towing of platform module 140 from the shallow-water location to deployment location 124 in an upright configuration. Once positioned at deployment location 124, mooring lines 116 are attached between platform module 140 and anchors 118 to hold the platform in position and provide horizontal restraint.

At operation 502, supports 402-1 and 402-2 (collectively referred to as supports 402) are conveyed from a construction location to deployment location 124. Typically, supports 402 float horizontally on the surface of ocean 122 and are towed to deployment location 124. In some embodiments, supports 402 are transported to deployment location 124 on a barge or other vessel. Although the illustrative embodiment comprises two supports 402, it will be clear to one skilled in the art, after reading this specification, how to make and use alternative embodiments of the present invention that comprise any practical number of supports 402, such as one support 402 or more than two supports 402.

Figure 6:
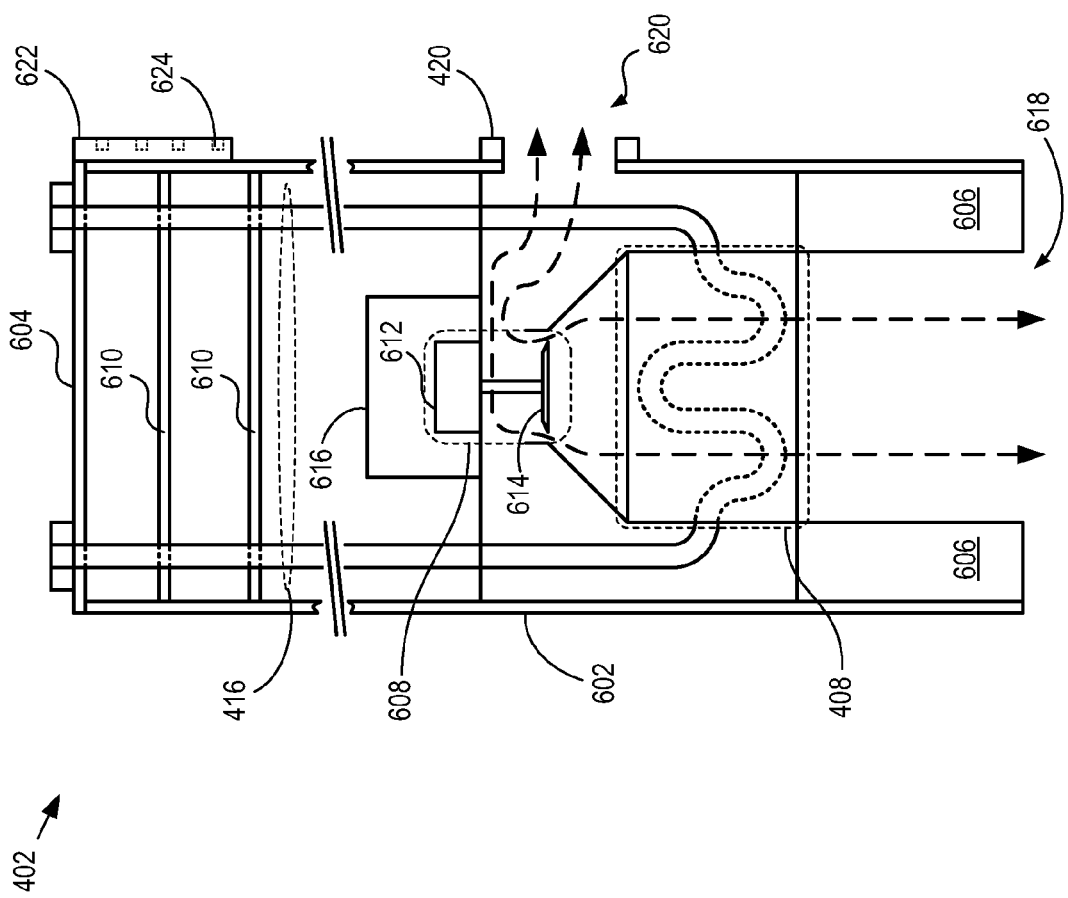
FIG. 6 depicts a schematic drawing of a support in accordance with the illustrative embodiment of the present invention.

FIG. 6 depicts a schematic drawing of a support in accordance with the illustrative embodiment of the present invention. Support 402 comprises shell 602, cover 604, ballast chamber 606, heat exchanger 408, pump 608, conduits 416, bulkheads 610, and mounting bracket 622.

Shell 602 is a substantially cylindrical sleeve made of a steel or other metal suitable for use in ship building. The cylindrical sleeve may be circular, rectangular, square or other suitable cross section for the purposes of fitting necessary components. Preferably, the material used for shell 602 is suitable for extended operation in the environment of deployment location 124. One skilled in the art will recognize that in some embodiments, shell 602 comprises a plurality of sections that are joined using appropriate joining technology. In some embodiments, stiffeners, girders and frames are included to provide sufficient strength against the pressure of the sea and loads imposed by waves, internal weight, and buoyancy.

Cover 604 and bulkheads 610 separate shell 602 into a plurality of substantially watertight compartments. In addition, bulkheads 610 provide additional mechanical strength to support 402.

At operation 503, each of supports 402-1 and 402-2 is rotated into a substantially vertical orientation by flooding ballast chamber 606. Once oriented properly, each of supports 402 is attached to platform module 140 at a mounting system 404.

Figure 7:
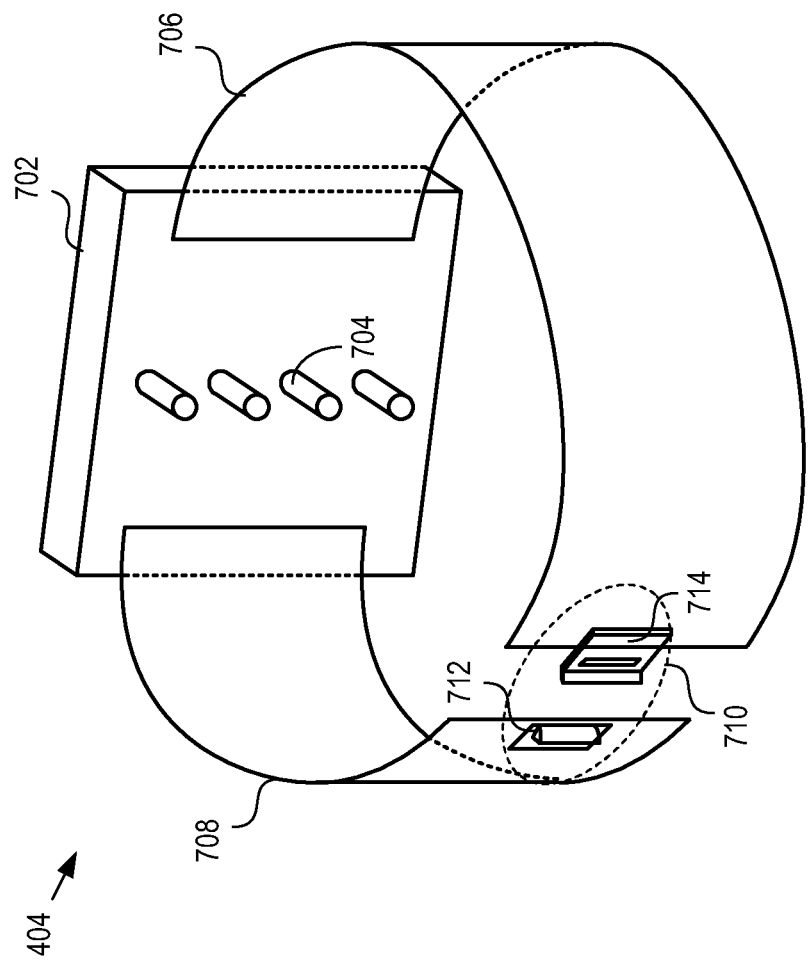
FIG. 7 depicts a schematic diagram of a mounting system in accordance with the illustrative embodiment of the present invention.

FIG. 7 depicts a schematic diagram of a mounting system in accordance with the illustrative embodiment of the present invention. Mounting system 404 comprises plate 702, mating pins 704, straps 706 and 708, and latch 710.

Plate 702 is a rigid plate that is attached to column 104.

Mating pins 704 project outward from seat 706 and are dimensioned and arranged to be received by complimentary holes 624 of mounting bracket 622. As a result, mating pins 704 locate a support 402 in seat 706.

Once support 402 is positively located by mating pins 704, straps 706 and 708 are wrapped around support 402 and detachably secured by latch 710. In order to secure latch 710, base 714 is engaged with cam 712.

The desired hydrodynamic performance of platform 400 is determined based on the environmental conditions at deployment location 124, including storm history, underwater currents, wind conditions, wave height, wavelengths, water temperature, and the like. The hydrodynamic performance of platform 400 is based on the buoyancy characteristics of the platform, its draft, and its water plane area. The water plane area of the platform affects its ability to withstand disturbances due to wave action, wind, etc. In some embodiments, the addition of supports 402 to platform module 140 changes the hydrodynamic performance of platform 400 by:
    i. changing its buoyancy characteristics; or
    ii. changing its draft; or
    iii. changing its water plane area; or
    iv. changing its moment of inertia; or
    v. changing its stability; or
    vi. any combination of i, ii, iii, iv, and v.

At operation 504, heat exchangers 408-1 and 408-2 are fluidically coupled with OTEC system 406, which is analogous to OTEC system 108, described above and with respect to FIG. 1.

Heat exchangers 408-1 and 408-2 are heat exchangers suitable for use in OTEC applications. Examples of heat exchangers suitable for use in support 402 are described in U.S. patent application Ser. No. 61/225,991, filed Jul. 16, 2009, U.S. patent application Ser. No. 61/624,594, filed Dec. 1, 2009, and U.S. patent application Ser. No. 61/573,982, filed Oct. 6, 2009, each of which is incorporated herein by reference.

Heat exchangers 408-1 and 408-2 and OTEC system 406 are fluidically coupled by connecting external conduits 410-1 and 410-2, respectively, to conduit 414 through fittings 412. Conduits 414, 416-1, and 416-2 are conventional conduits suitable for conveying working fluid, such as ammonia, through OTEC system 406. Fluidically coupled conduits 414, 416-1, and 416-2 collectively define a closed-loop conduit that is analogous to closed-loop conduit 138 described above and with respect to FIG. 1.

Pump 608 comprises motor 612 and impeller 614. Motor 612 is housed within chamber 616, which substantially protects the motor from exposure to seawater.

In evaporator operation, such as that depicted for support 402-1, pump 608 draws warm seawater from surface region 132 into port 620 and drives the warm seawater through heat exchanger 408. After passing through heat exchanger 408, the seawater is ejected back into ocean 122 through port 618. The pathway between ports 618 and 620 is represented as conduit 418 in FIG. 4. At heat exchanger 408, working fluid flowing through internal conduit 416 is thermally coupled with the warm seawater and vaporized. The vaporized working fluid expands and drives turbogenerator 114. Turbogenerator 114 generates electrical energy and provides it on output cable 110. In some embodiments, port 620 is fluidically coupled to a warm water conduit at fitting 420 to enable warm seawater from a shallower depth to be drawn into port 620. In some embodiments, support 402 comprises a pump for pumping working fluid through conduits 414, 416-1, and 416-2.

In condenser operation, such as that depicted for support 402-2, port 620 is fluidically coupled with cold-water conduit 126 at fitting 420. Pump 608 draws cold seawater from deep-water region 128 into port 618 and drives the cold seawater through heat exchanger 408. After passing through heat exchanger 408, the seawater is ejected back into ocean 122 through port 618. At heat exchanger 408, vaporized working fluid from turbogenerator 114 is thermally coupled with the cold seawater and condenses back into liquid form.

In some embodiments, support 402 comprises more than one heat exchanger and associated conduits. In addition, in some embodiments, support 402 comprises systems that are other than heat exchangers, such as pumps, electrical systems, communications equipment, cranes, storage space, housing facilities, etc. In some embodiments, a single support can include:
    i. multiple evaporators; or
    ii. multiple condensers; or
    iii. evaporators and condensers; or iv. one or more systems other than a heat exchanger; or
v. any combination of i, ii, ii, and iv.

The inclusion of heat exchangers (and/or other systems) affords embodiments of the present invention several advantages over conventional floating platforms.

First, production capacity of an OTEC platform can be changed by adding or removing supports. For example, the electrical generation capability of a floating platform in accordance with the present invention can grow with increasing energy demand by adding additional supports as necessary throughout the lifetime of the platform. As a result, a platform need not be deployed with excess capability in anticipation of future energy demands.

Second, the present invention makes it easier to service a floating platform when necessary. Heat exchangers are prone to bio-fouling, damage, etc. It is difficult, however, to service a heat exchanger at a deployment location. In addition, the time required to service a heat exchanger on-site reduces the uptime and overall efficiency of the OTEC platform. The present invention enables a support comprising a mechanical system, such as a heat exchanger, to be rapidly replaced with another such support. As a result, downtime for the platform is reduced and the damaged heat exchanger can be easily transported back to a shore installation for service.

Third, new functionality can be added to a floating platform simply by attaching a support that comprises a suitable system.

Fourth, the load capacity of a floating platform can be increased by attaching additional deck modules without removing the floating platform from deployment location 124. For a conventional floating platform, increasing deck size is difficult, if not impossible, since the hydrodynamic performance of the platform is determined at design. By attaching additional supports in accordance with the present invention, the hydrodynamic performance of a floating platform can be changed, on-site, to accommodate additional deck area.

Although support 402 comprises a heat exchanger that is located within shell 602, it will be clear to one skilled in the art, after reading this specification, how to specify, make, and use alternative embodiments of the present invention wherein a support comprises a system that is mounted to an external surface of shell 602.

Figure 8:
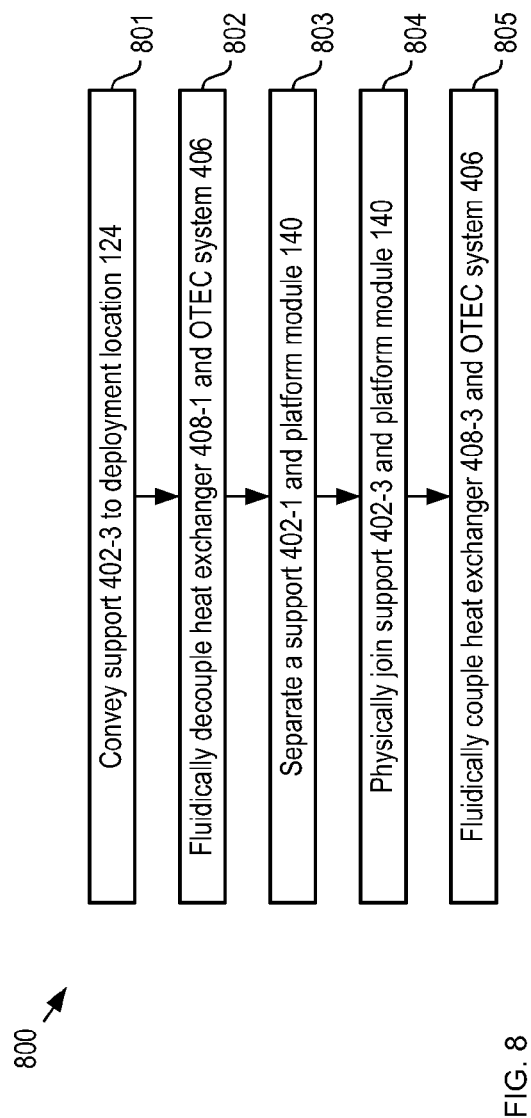
FIG. 8 depicts operations of a method suitable for refurbishing a floating platform in accordance with the illustrative embodiment of the present invention.

FIG. 8 depicts operations of a method suitable for refurbishing a floating platform in accordance with the illustrative embodiment of the present invention. Method 800 is described herein with reference to FIGS. 4, 6, and 7. Method 800 begins with operation 801, wherein a replacement support (e.g., a support 402-3) is conveyed to location 124.

At operation 802, external conduits 410-1 are disconnected from conduits 416-1 at fitting 412 to fluidically decouple heat exchanger 408-1 and OTEC system 406.

At operation 803, support 402-1 is removed from platform module 140 by disengaging mounting system 404. Ballast chamber 606 is then vented with air to empty it of seawater, which induces support 402-1 to float horizontally on the surface of ocean 122 to facilitate its transport to a repair facility.

At operation 804, support 402-3 (which is substantially identical to support 402-1) is rotated from a horizontal orientation on the surface of ocean 122 into a substantially vertical orientation by flooding its ballast chamber 606. Support 402-3 and platform module are physically joined by seating support 402-3 in mounting system 404 and securing straps 706 and 708 with latch 710.

At operation 805, external conduits 410-1 are fluidically coupled with conduits 416-3 at fitting 412 to fluidically couple heat exchanger 408-3 and OTEC system 406.

At the completion of operation 805, platform 400 is again operational.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   providing a platform module at a deployment location in a body of water, wherein the platform module is characterized by a first hydrodynamic performance, and wherein the platform module is hydrodynamically stable at the deployment location;
   conveying a first support from a first location to the deployment location, wherein the first support is characterized by a second hydrodynamic performance, and wherein the first support comprises a first system having a first functionality; and
   physically joining the first support and the platform module while the first support and the platform module are at the deployment location, wherein the first support and the platform module are physically joined at a first mounting position on the platform module;
   wherein the physically joined first support and platform module are collectively characterized by a third hydrodynamic performance.

2. The method of claim 1 further comprising providing the first support such that the first system comprises a heat exchanger.

3. The method of claim 2 further comprising fluidically coupling the first system and a second system that generates electrical energy based on a temperature difference, wherein the platform module comprises the second system.

4. The method of claim 1 further comprising providing the first support such that the first system comprises a system for pumping a fluid.

5. The method of claim 1 further comprising:
   conveying a second support from a second location to the deployment location, wherein the second support comprises a second system having a second functionality; and
   physically joining the second support and the platform module while the second support and the platform module are at the deployment location.

6. The method of claim 1 further comprising:
   conveying a second support from a second location to the deployment location, wherein the second support comprises a second system having a second functionality;
   separating the first support and the platform module while the first support and the platform module are at the deployment location; and
   physically joining the second support and the platform module while the second support and the platform module are at the deployment location, and wherein the second support and the platform module are physically joined at the first position.

7. The method of claim 6 wherein the first functionality and the second functionality are substantially the same functionality.

8. An apparatus comprising:
   a platform module, wherein the platform module is characterized by a first hydrodynamic performance, and wherein the platform module is hydrodynamically stable at a deployment location in a body of water;

a first support, wherein the first support is characterized by a second hydrodynamic performance, and wherein the first support comprises a first system having a first functionality; and a first mounting system for demountably joining the first support and the platform module at a first mounting position on the platform module, wherein the first mounting system is dimensioned and arranged to enable the physical joining of the platform module and the first support while the platform module and first support are located at the deployment location;

wherein the first support and the platform module are collectively characterized by a third hydrodynamic performance when the first support and the platform module are physically joined.

9. The apparatus of claim 8 further comprising a second system for generating electrical energy based on a temperature difference, wherein the platform module comprises the second system, wherein the first system comprises a first heat exchanger; and wherein the first support is dimensioned and arranged to enable the thermal coupling of the first heat exchanger and the second system when the first support and the platform module are physically joined.

10. The apparatus of claim 9 wherein the second system comprises a Rankine engine.

11. The apparatus of claim 9 wherein the second system comprises a solid-state thermoelectric element.

12. The apparatus of claim 9 further comprising a conduit, wherein the conduit depends from the platform module, and wherein the conduit enables the thermal coupling of the second system and water from a deep-water region of the body of water;

wherein the first heat exchanger enables the thermal coupling of the second system and water from a surface-region of the body of water.

13. The apparatus of claim 9 further comprising a second heat exchanger:

wherein a first temperature at the first heat exchanger is based on the temperature of water in a surface-region of the body of water;

wherein a second temperature at the second heat exchanger is based on the temperature of water in a deep-water region of the body of water; and wherein the temperature difference is based on the first temperature and the second temperature.

14. The apparatus of claim 13 wherein the first support comprises the second heat exchanger.

15. The apparatus of claim 13 wherein the platform module comprises the second heat exchanger.

16. The apparatus of claim 9 further comprising:

a second support, wherein the second support is characterized by a fourth hydrodynamic performance, and wherein the second support comprises the second heat exchanger; and a second mounting system, wherein the second mounting system is dimensioned and arranged to enable the demountable physical joining of the platform module and the second support while the platform module and second support are located at the deployment location;

wherein the first support, second support, and platform module are collectively characterized by a fifth hydrodynamic performance when the first support, second support, and platform module are physically joined.

17. The apparatus of claim 8 further comprising:

a second support, wherein the second support is characterized by a fourth hydrodynamic performance, and wherein the second support comprises a second system having a second functionality; and a second mounting system, wherein the second mounting system is dimensioned and arranged to enable the demountable physical joining of the platform module and the second support while the platform module and second support are located at the deployment location;

wherein the first support, second support, and platform module are collectively characterized by a fifth hydrodynamic performance when the first support, second support, and platform module are physically joined.

18. The apparatus of claim 8 wherein the first system comprises a system for pumping a fluid.

19. The apparatus of claim 8 further comprising a second support, wherein the second support is characterized by a fourth hydrodynamic performance, and wherein the second support comprises a second system having a second functionality;

wherein the first mounting system is dimensioned and arranged to enable the separation of the first support and the platform module and the physical joining of the second support and the platform module at the first mounting position while the platform module and second support are located at the deployment location; and wherein the second support and the platform module are collectively characterized by a fifth hydrodynamic performance when the second support and the platform module are physically joined.

20. An apparatus comprising:

(1) a platform module, wherein the platform module is characterized by a first hydrodynamic performance, and wherein the platform module is hydrodynamically stable at a deployment location in a body of water;

(2) a first system for generating electrical energy based on a temperature difference, wherein the platform module comprises the first system, and wherein the first system and water in a first region of a body of water are thermally coupled;

(3) a first support, wherein the first support is characterized by a second hydrodynamic performance, and wherein the first support comprises a heat exchanger for thermally coupling the first system and water in a second region of the body of water; and (4) a first mounting system, wherein the first mounting system is dimensioned and arranged to enable the platform module and the first support to be demountably physically joined while the platform module and first support are located at a deployment location in the body of water;

wherein the first support and the platform module are collectively characterized by a third hydrodynamic performance when the first support and the platform module are physically joined.

* * * * *